United States Patent [19]
Fuderer

[11] 4,374,022
[45] Feb. 15, 1983

[54] CONSTANT PRESSURE SEPARATION OF NORMAL PARAFFINS FROM HYDROCARBON MIXTURES

[75] Inventor: Andrija Fuderer, Antwerp, Belgium

[73] Assignee: Union Carbide Corporation, Danbury, Conn.

[21] Appl. No.: 189,353

[22] Filed: Sep. 30, 1980

[51] Int. Cl.³ .......................................... C25G 25/03
[52] U.S. Cl. ................................. 208/310 Z; 585/826
[58] Field of Search .................. 208/310 Z; 585/826, 585/829, 821

[56] References Cited

U.S. PATENT DOCUMENTS

| | | | |
|---|---|---|---|
| 3,284,346 | 11/1966 | Anstey | 208/310 |
| 3,291,725 | 12/1966 | Brodbeck | 208/310 |
| 3,342,726 | 9/1967 | Mowll et al. | 208/310 |
| 3,422,005 | 1/1969 | Avery | 208/310 |
| 3,770,621 | 11/1973 | Collins et al. | 208/310 |
| 4,176,053 | 11/1979 | Holcombe | 208/310 |

Primary Examiner—Winston A. Douglas
Assistant Examiner—William Leader
Attorney, Agent, or Firm—Alvin H. Fritschler

[57] ABSTRACT

Normal paraffins are separated from a hydrocarbon vapor feedstream having 10 to 25 carbon atoms per molecule in a constant pressure process employing a molecular sieve adsorbent and n-hexane for purging and for dilution of gas oil - containing feedstocks. A portion of the countercurrent, desorption purge effluent is employed as a hexane - containing cocurrent purge stream, thereby significantly reducing the required amount of n-hexane purge recycle material, and the size of the equipment and the energy consumed in the processing of said recycle stream. A portion of said countercurrent purge effluent can also be used to provide a source of n-hexane diluent for the gas oil - containing feedstocks, as can the cocurrent purge effluent, resulting in further reduction in required equipment and energy costs, and increasing adsorption efficiency and adsorbent utilization.

10 Claims, 1 Drawing Figure

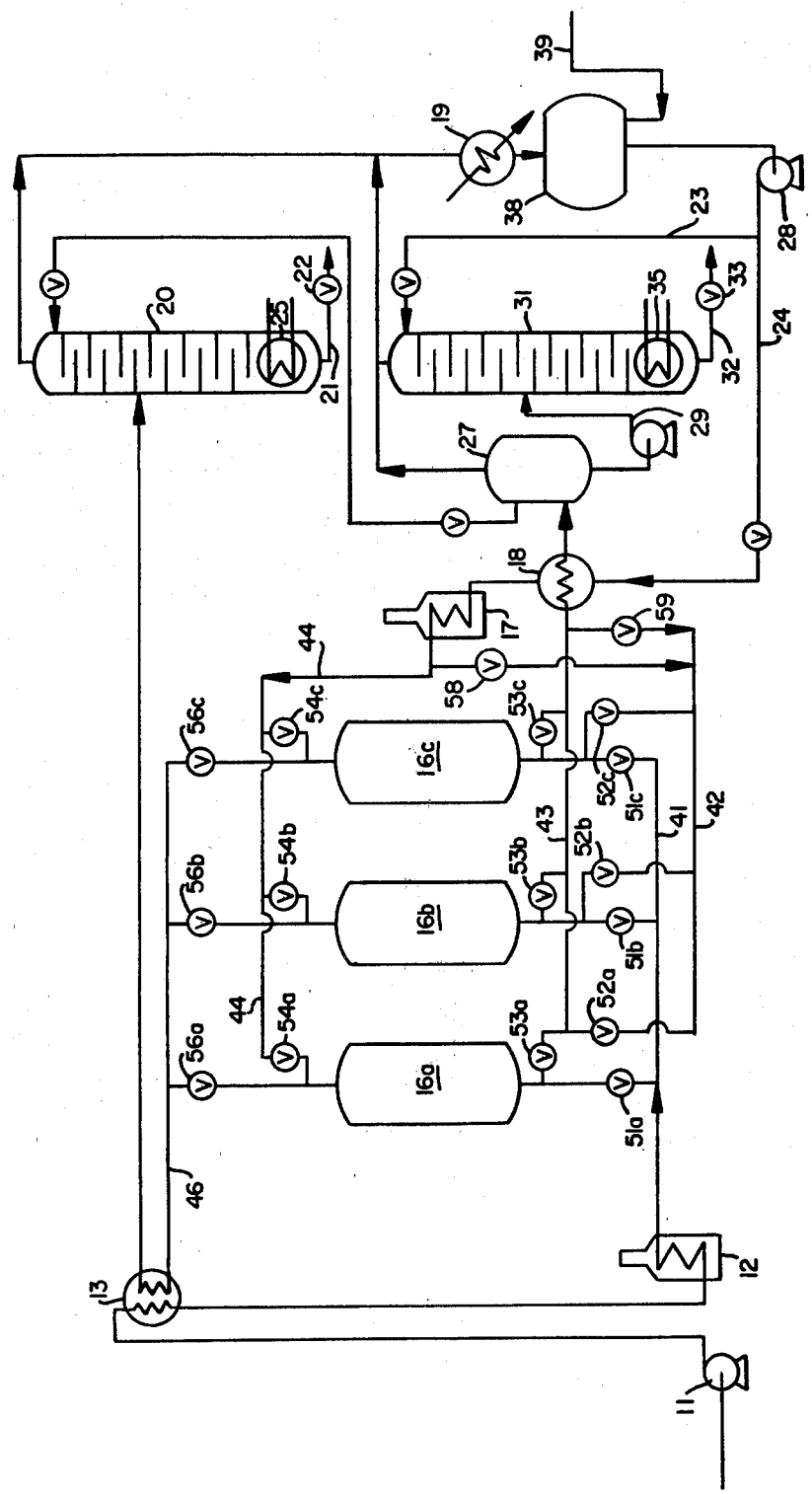

CONSTANT PRESSURE SEPARATION OF NORMAL PARAFFINS FROM HYDROCARBON MIXTURES

BACKGROUND OF THE INVENTION

1. Field of the Invention:

This invention relates to the separation of normal paraffins from non-normal hydrocarbons in hydrocarbon vapor feed mixtures. More particularly, it relates to a process for the enhanced separation of normal paraffins from gas oil and kerosene feed streams.

2. Description of the Prior Art:

An isobaric process for the separation of normal paraffins from a hydrocarbon vapor feedstream having 10–25 carbon atoms per molecule and containing a mixture of said normal paraffins and non-normal hydrocarbons is disclosed in the Avery patent, U.S. Pat. No. 3,422,005. The feed for this process may contain gas oil having 16 to 25 carbon atoms per molecule, kerosene having 10 to 15 carbons, or a mixture thereof. As disclosed in the patent, the process includes the steps of (1) adsorption, i.e. selective adsorption of normal paraffins, (2) cocurrent purge with n-hexane to sweep out void space vapor containing a high concentration of non-adsorbable components, i.e. non-normal hydrocarbons, from the upper or effluent end of the bed, (3) countercurrent purge with n-hexane to desorb normal hydrocarbon adsorbate from the bed, the highest molecular weight, adsorbed normal hydrocarbons being concentrated near the bottom or feed inlet end of the bed. The effluent removed from the upper end of the bed is cooled and passed to a non-normal dehexanizer column from which non-normal hydrocarbons are withdrawn as a liquid bottoms product. The effluent removed from the bottom end of the bed is cooled and passed to a normal paraffin dehexanizer column from which normal paraffin bottoms are withdrawn. The n-hexane discharged as overhead from said columns is transferred to storage as liquid and is subsequently heated and used as purge fluid as indicated above. The advantages of employing n-hexane as the purge fluid and of employing a relatively high isobaric adsorption-desorption pressure level, together with a relatively low adsorption-desorption temperature range, are set forth in the Avery patent.

While the process of the Avery patent is a desirable one that enables normal paraffins to be advantageously separated from hydrocarbon vapor feed streams, it is of interest in the art to develop improved techniques for carrying out the process, particularly techniques enabling equipment costs to be reduced and energy to be conserved. One significant feature of the invention of particular interest in this regard is the n-hexane employed for cocurrent and countercurrent purge. The advantages of employing n-hexane for such purposes are recited in the Avery patent. While the use of n-hexane in the process is highly desirable and preferred, the equipment employed and the energy consumed in the use of redistilled n-hexane recycle material for such purge purposes nevertheless represent a significant element of expense in the practice of the separation process as provided by Avery. Any reduction in the size of the equipment and the consumption of energy associated with the use of n-hexane for purge purposes on a recycle basis would serve to enhance the overall technical and economic feasibility of the Avery process for use in practical commercial operations.

It has been found and reported by Avery, that the separation process should be carried out at a temperature above the dew point of the hydrocarbon feed and sufficiently high to avoid capillary condensation. This is necessary to avoid the forming of a liquid meniscus in the macropores of the adsorbent pellets. If such precaution were not taken, the isomer condensate in the absorbent macropores would not be completely removed during the copurge or displacement step, and the normal paraffin purity as well as the separation of adsorbed and unadsorbed components would be lower than in an all-vapor process. It is possible to avoid capillary condensation by ensuring that the ratio of feed saturation pressure (i.e. dew point pressure) to operating pressure is more than about 2. For this purpose, a gas oil feedstock having, for example, a dew point of 670° F. at a typical operating pressure of 25 p.s.i.a. should be contacted with a molecular sieve adsorbent at a temperature of about 730° F. At such a temperature, however, excessive cracking of the gas oil vapor feed occurs, with coke formation and rapid deactivation of the adsorbent resulting therefrom. For this reason, it is preferred to operate at temperatures of between about 600° and 700° F. with gas oil feedstocks. In this regard, it should be noted that the cracking and deactivation rates increase with increasing molecular weights, and the problems are less serious with respect to the lighter kerosene feedstocks. A particular problem exists, therefore, in the processing of gas oil feedstocks so as to operate at a temperature sufficiently high to avoid capillary condensation without encountering significant cracking and deactivation problems.

Avery discloses the overcoming of this problem by the introduction of sufficient redistilled n-hexane purge gas into the gas oil-containing feed to lower the resulting mixture's dew point and to avoid capillary condensation at the desired operating pressure, so as to permit operation at a temperature below 700° F. As the adsorbent already contains normal hexane from the previous purge step, the n-hexane introduced into the feed for dilution thereof is discharged from the bed with the unadsorbed non-normal hydrocarbons and the previously adsorbed n-hexane. This effluent is fractionated as indicated above, with the n-hexane overhead fraction being recycled for use as purge gas or for mixing with the feed material.

It has also been proposed to recycle the adsorption effluent, i.e. non-normal hydrocarbon product, to the feedstock for the desired dilution thereof. While both of such techniques are useful in overcoming capillary condensation while enabling temperatures below 700° F. to be employed, each is accompanied by disadvantages that limit the overall economy and effectiveness of the separation process. Thus, the use of redistilled n-hexane for feedstock dilution increases the size of the equipment employed and the amount of energy consumed in the processing of the n-hexane recycle stream, thereby increasing the cost of the overall operation. The use of the adsorption effluent for such dilution purposes tends to increase the amount of non-normals in the feed and also the amount of normal paraffins present in the product effluent, reducing the normals as well as the non-normal hydrocarbon product purity and the separate recovery of n-paraffin material. There is a need in the art, therefore, for improvements in the process for separating normal paraffins from hydrocarbon mixtures, particularly as exist in gas oil feedstocks.

It is an object of the invention to provide an improved process for the separation of normal paraffins from hydrocarbon feedstocks.

It is another object of the invention to provide a means for reducing the equipment and energy costs associated with the use of a distilled n-hexane recycle stream in the process for separating n-paraffins from hydrocarbon feedstocks.

It is another object of the invention to provide an improved process for the separation of n-paraffins from gas oil feedstocks without capillary condensation effects.

It is a further object of the invention to provide a process for the effective and efficient separation of normal paraffins from gas oil feedstocks at temperatures below 700° F.

With these and other objects in mind, the invention is hereinafter described in detail, the novel features thereof being particularly pointed out in the appended claims.

SUMMARY OF THE INVENTION

The objects of the invention are accomplished by an isobaric separation process in which countercurrent, desorption purge effluent is used as a n-hexane-containing cocurrent purge stream, thereby significantly reducing the required amount of n-hexane purge recycle stream. In turn, this reduces the size of the equipment and the amount of energy consumed in the redistillation, pumping, evaporation, and heating to adsorption temperature and use of the n-hexane recycle stream. The copurging with counter-current purge effluent results in the adsorption of additional amounts of normal paraffins by the adsorption bed as said countercurrent purge effluent contains such n-paraffins therein. Significantly, the absorbent bed size can remain the same as if normal hexane had been employed for copurge purposes.

As an additional improvement, a portion of the countercurrent purge effluent, and/or cocurrent purge effluent, can also be employed as n-hexane-containing diluent for gas oil-containing feedstreams. Such diluent is employed in sufficient quantity to lower the dew point of the mixture of said effluent diluent stream or streams and said gas oil-containing feed and to avoid capillary condensation so that the normal paraffins can be separated from the gas oil feed at the desired operating pressure and at a temperature below 700° F.

BRIEF DESCRIPTION OF THE DRAWING

The invention is hereinafter described with reference to the accompanying single FIGURE drawing representing a schematic flowsheet for an illustrative embodiment of the invention utilizing three adsorbent beds operating in parallel.

DETAILED DESCRIPTION OF THE INVENTION

The invention constitutes an improved process for the separation of normal paraffins from hydrocarbon vapor mixtures present in gas oil or kerosene-containing feedstocks. Gas oil may be broadly defined, for purposes of this invention, as a hydrocarbon mixture having an initial boiling point, according to the American Society of Testing Materials (ASTM), of above 400° F. and an ASTM final boiling point below 700° F. Gas oil generally contains from about 10 to about 40 mol percent normal paraffins having 16 to 25 carbon atoms. These normal paraffins are employed as raw materials for the synthesis of proteins, plasticizers and alcohols. It is necessary, however, to separate such normal paraffins from non-normal hydrocarbons contained in the gas oil feed material.

Similarly, the invention can be used for the separation of normal paraffins from non-normal hydrocarbons contained in kerosene feed material. Such kerosene may be broadly defined as a hydrocarbon mixture having an initial ASTM boiling point of about 275° F. and an ASTM final boiling point below 600° F. Kerosene contains between about 10 and 40 mol percent normal paraffins having 10 to 15 carbon atoms per molecule.

As noted above, the Avery patent discloses an isobaric or constant pressure process for achieving such separations, comprising: (1) adsorbing the normal paraffins on an adsorbent, (2) cocurrently purging the adsorbent bed with n-hexane to remove non-normal hydrocarbons, and (3) countercurrently purging the bed with n-hexane to desorb the normal paraffins from the bed. When gas oil-containing feedstreams are being processed, additional n-hexane is employed to dilute the gas oil feed to lower the dew point of the feed mixture and to avoid capillary condensation so that the process can be carried out at less than 700° F. to avoid excessive cracking of the gas oil vapor feedstock, with resultant coke formation and rapid deactivation of the adsorbent.

The invention resides in the use of countercurrent purge effluent, i.e. the desorption effluent, as a source of the n-hexane used for cocurrent purge of the bed. Such countercurrent purge effluent is used in place of n-hexane obtained by redistillation of the cocurrent purge and said countercurrent purge effluent or of the adsorption effluent. The size of the equipment and the amount of energy consumed for the n-hexane purge recycle stream is thereby reduced.

Referring to the drawings, the gas oil or kerosene containing feedstock enters the illustrated process system through pump 11 at, e.g. 65 p.s.i.a., said feed being heated, e.g. to 600° F., in exchange 13 and heater 12 from which it is passed through conduit 41 and control valve 51a to first molecular sieve adsorbent bed 16a. The bed may typically contain calcium zeolite A in the form of 1/16 inch pellets. The feed vapor mixture is passed upwardly through said molecular sieve bed 16a at about 30 p.s.i.a. for adsorption of the normal paraffins therefrom. During the adsorption step, normal paraffins are selectively adsorbed, and a normal paraffin adsorption front is formed near the inlet end of bed 16a. As adsorption continues, this front moves upwardly from the inlet end, displacing less strongly held n-hexane purge component adsorbed in the previous processing cycle. A portion of the non-normal hydrocarbons not adsorbed from the feed upon passage through the bed, i.e. cyclic and branch chain hydrocarbons, are discharged through the upper end of bed 16a into conduit 46 as the first effluent. This effluent also contains the progressively displaced, re-adsorbed and re-displaced n-hexane purge component and any n-hexane used as diluent for the hydrocarbn feed. It should be appreciated that the normal paraffin adsorption front actually consists of many individual fronts, each due to a particular molecule's adsorptivity on the molecular sieve adsorbent in bed 16a. For normal paraffins, the molecules containing the lowest number of carbon atoms will be the least strongly adsorbed. Such molecules will thus be the leading front in the bed. After a predetermined time that is preferably when the leading adsorption front has reached a predetermined point within bed 16a, as for example after about 5 minutes, the hydrocarbon feedstream flow is terminated by closing inlet valve 51a.

The first effluent from bed 16a, containing about 20% n-hexane, is passed through control valve 56a to joining conduit 46 from which it is passed through heat exchanger 13. To facilitate fractional condensation, the first effluent is cooled to about 380° F. therein by a coolant, such as the hydrocarbon feed. The cooled first effluent is directed to non-normals dehexanizer column 20 at about 20 p.s.i.a. In this column, the non-normal hydrocarbons are separated and withdrawn as a liquid bottoms product through conduit 21 having control valve 22 herein. The n-hexane is discharged as an overhead fraction. Dehexanizer 20 comprises a distillation column with a sufficient number of theoretical plates so that n-hexane appears in the overhead, and the bottoms are free of n-hexane as needed to meet a particular non-normal hydrocarbon product specification. Dehexanizer 20 also includes a reboiler 25 at the bottom. The overhead vapors from the dehexanizers are condensed in air-cooled or water-cooled condenser 19 and are collected in storage vessel 38, from which n-hexane is passed by pump 28 through conducit 23 to the dehexanizers as reflux and through conduit 24 to heat exchanger 18 and from there to heater 17 and conduit 44 for desorption purge.

Upon completion of the adsorption step, a portion of the desorption effluent vapor in conduit 43 is diverted through conduit 42, including control valves 59 and 52a therein, to the inlet bottom end of first bed 16a for upward flow therethrough in the same direction, i.e. cocurrent, with the previously flowing hydrocarbon feed vapor. This purge vapor contains essentially the same composition of n-hexane as the purge recycle n-hexane employed for this purpose in the known practice, and it has been found that said desorption effluent can be effectively employed in place of recycle, redistilled n-hexane. The cocurrently flowing purge vapor is capable of being internally adsorbed, and effectively removes the non-internally sorbed molecules, i.e. the non-normal hydrocarbons, remaining in the bed, together with residual feed vapor remaining in the non-selective areas of the bed after adsorption. The cocurrently flowing purge vapor is passed through first adsorption chamber 16a at the adsorption step temperature and pressure. Such cocurrent flow is necessary to sweep out the void space vapor that contains the highest concentration of non-adsorbable components at the upper, or effluent, end of the bed.

The use of desorption effluent for cocurrent purge in the practice of the invention has been found advantageous, as noted above, in that the amount of redistilled, recycle n-hexane processed in each operating cycle is reduced, resulting directly in an appreciable savings in energy and equipment required for the overall process.

In an alternate embodiment of the invention, a copurge effluent conduit and control valves (not shown) are employed in place of copurge feed conduit 42 and control valves 59, 52a, 52b, and 52c. The copurge vapor is supplied directly through desorption effluent valves 53a, 53b, 53c, with two desorption effluent valves always being open during the copurge step. In this embodiment, the copurge feed quantity is controlled on the effluent conduit rather than on the feed conduit. In embodiments in which the copurge effluent, or a portion thereof, is diverted as a source of n-hexane for feed dilution purposes, the copurge effluent is partly directed to conduit 46 and partly to the copurge effluent conduit, whereas all the copurge effluent is directed to conduit 46 when such feed dilution by the copurge effluent is not practiced.

Upon completion of the cocurrent purge step, n-hexane purge vapor is introduced from conduit 44 and control valve 54a therein, to the upper end of the first bed 16a at substantially the adsorption step temperature and pressure for countercurrent purge flow therethrough. This countercurrent purge desorbs the normal paraffin hydrocarbon adsorbate from molecular sieve bed 16a. The resulting mixture is discharged from the lower end through conduit 43 having control valve 53a therein. Countercurrent purging is used for desorption of the adsorbate because the heaviest, i.e. highest molecular weight, normal hydrocarbons are more concentrated near the feed inlet, lower end of the bed. By employing countercurrent flow, the heaviest paraffin hydrocarbons are subjected to the purging or desorbing influence of both the purge vapor itself and the lighter paraffin hydrocarbons desorbed from the upper end of the bed.

The second effluent in conduit 43, containing between about 80 and 97% by weight n-hexane, is cooled from 600° F. to about 200° F. in heat exchanger 18 by liquid n-hexane and is then directed to phase separator vessel 27 with 2-3 enrichment trays. Substantially pure n-hexane vapor is sent therefrom to condenser 19. The remaining normal paraffin—hexane mixture is directed through conduit 29 to normals dehexanizer column 31 at about 22 p.s.i.a. The cooling and phase separation steps serve to facilitate separation of the n-hexane and normal paraffins by fractional condensation, where the separation may be enhanced by 2-3 trays, and to reduce the quantity of n-hexane that must be processed in dehexanizer column 31. In this column, the vapor mixture is separated into a normal paraffin bottoms component that is withdrawn through conduit 32 having control valve 33 therein, and a n-hexane overhead component. Said normal paraffins dehexanizer column 31, which operates similarly to non-normal dehexanizer column 20, has reboiler 35 at the lower end, and an appropriate number of theoretical plates so that the n-hexane appears in the overhead, and the bottoms are free of n-hexane as needed to meet a particular normal paraffin hydrocarbon product specification.

The n-hexane overhead from normals dehexanizer column 31 is passed to condenser 19 and therefrom to storage vessel 38, along with the n-hexane overhead fraction from non-normals dehexanizer column 20. The n-hexane overhead from phase separator 27 can also be condensed in condenser 19 and transferred to storage vessel 38.

Any makeup n-hexane that may be needed for the process may be introduced to storage vessel 38 from an external source through conduit 39. The n-hexane required for purging is withdrawn from vessel 38 by means of n-hexane pump 28. Such n-hexane is warmed and evaporated by passing through heat exchanger 18, countercurrently with said second effluent, and is then heated to essentially the adsorption temperature in heater 17. The resulting hot n-hexane vapor is then directed through conduit 44 and control valve 54a therein, during the appropriate period, for countercurrent purging of first bed 16a, thereby desorbing the normal paraffin adsorbate as previously indicated. As required, said n-hexane can also be recycled through conduit 42 and control valve 58 for use in the cocurrent purge, during the appropriate period, in addition to the use of desorption effluent as a source of n-hexane for cocurrent purge in the practice of the invention.

Although the process has been specifically described in terms of sequential adsorption, cocurrent purge and countercurrent desorption of first bed 16a, it will be apparent to those skilled in the art that second and third beds 16b and 16c may also be filled with molecular sieve adsorbent, and undergo the same sequence of steps approximately shifted in time. Such an arrangement in which more than one adsorbent bed is employed is preferred since most commercial operations require continuous production, and the normal paraffin and non-normal hydrocarbon products can only be produced intermittently with a one adsorbent chamber system. For this reason, at least three adsorbent beds are usually employed so that, while one bed is on the adsorption step, another bed is on cocurrent purging, and a third bed is on countercurrent desorption. This permits continuous production of both n-paraffins and non-normal hydrocarbons by means of the three step process. The flows between first, second and third adsorbent chambers are switched at the appropriate times in a manner well known to those skilled in the art. The second and third adsorption chambers are accompanied by conduits and control valves, such as 52b, 52c, 54b and 54c, corresponding to those described with reference to first bed 16a.

It will be appreciated that various changes and modifications can be made in the process described above without departing from the scope of the invention claimed herein. Thus, the adsorption-purge-desorption steps can be carried out at temperatures of from about 500° to 700° F., preferably at a temperature within the range of from about 600° F. to said 700° F. As disclosed by the Avery patent, the purge and desorption step temperatures and pressures are desirably the same as those employed in the adsorption step. Such processing steps are carried out in an essentially constant pressure process, employing a relatively high, superatmosphere pressure in the range of from about 15 to about 65 p.s.i.a. It is within the scope of the invention, particularly in the treatment of gas oil-containing feedstocks, to divert the cocurrent purge, or a portion thereof, for mixture with the feedstock so as to enable the process to be carried out at less than 700° F. while avoiding undesirable capillary condensation effects. It is preferred, in this embodiment, not to employ the initial cocurrent purge effluent for such feedstock dilution as said initial portion of the effluent contains essentially non-normal hydrocarbons. The last 30% to 70%, commonly the last 50% to 70%, of the total cocurrent purge effluent is used for feedstock dilution in preferred operations using the cocurrent purge effluent for such purposes. The cocurrent purge effluent serves as a source of n-hexane for such dilution, further reducing the equipment size and energy consumption required for the processing of recycle n-hexane. In addition, the normal paraffins in the cocurrent purge effluent will be recycled and adsorbed in the bed so as to enable the n-paraffin adsorption front to proceed nearer to the effluent end of the bed without reducing the n-paraffin recovery or the purity of the non-normal hydrocarbons recovered from the bed during the cocurrent purge step. The adsorption efficiency, or adsorbent utilization, of the process is thus further enhanced by such use of the copurge effluent for dilution purposes.

In another embodiment of the invention, a portion of the desorption effluent can be employed as a source of n-hexane for feedstock dilution, particularly of gas oil-containing feedstocks. It is desirable to employ only the desorption effluent from a bed that is completing its desorption step, said effluent having a normal paraffin content of below about 6 weight percent, and generally on the order of about 3-4 weight percent. As with the dilution of the feedstock by use of the copurge effluent as a source of n-hexane, the use of a portion of the desorption effluent for dilution purposes results in a considerable savings in equipment and fuel costs, while enhancing the efficiency of the adsorption operation and the utilization of the adsorption bed. The use of a portion of the desorption effluent taken as the bed is completing its countercurrent purge step is facilitiated, as will be appreciated by those skilled in the art, by the use of more than one bed, as in the three bed system shown in the drawing.

Various other aspects of the subject adsorption-purge-desorption process for separating normal paraffins from hydrocarbon mixtures are described in the Avery patent referred to above and incorporated herein by reference. Such aspects, including the molecular sieve adsorbents suitable for use in the process and information concerning the relationship between dew point and capillary condensation points for a particular gas oil at various operating pressures, and the means for determining the percentage dilution of the gas oil feed with normal hexane or other diluents, need not be repeated herein. In the practice of the invention, of course, gas oil-containing feed is diluted with n-hexane, copurge effluent or desorption effluent as a source of n-hexane, to permit operation of the process with such gas oil feed at a temperature below 700° F.

In the carrying out of the process in experimental runs, a feed having an average molecular weight of 195 and a normal paraffin content of 20.35 wt.%, ranging from $C_7$ to $C_{26}$ hydrocarbons, was treated at 360° C. and a pressure of 25 psia. in an adsorption system containing 8.3 kg of conventional adsorbent per adsorption bed. Desorption effluent was employed for cocurrent purge, in accordance with the invention, in place of redistilled recycle n-hexane. The desorption effluent thus employed for cocurrent purge contained 4-10 wt.% normal paraffin hydrocarbons. The feed was diluted by the use of 22.6% by weight n-hexane. It was determined as a result of such runs that the size of the adsorbent bed need not be increased to adsorb the additionally introduced normal paraffins present in the desorption effluent used for cocurrent purge. The same size bed employed when redistilled, recycle n-hexane is employed for cocurrent purge was satisfactory for use with desorption effluent as the cocurrent purge material. There also appeared to be no difference in the purity of the normal paraffin product obtained in the practice of the invention than is obtained using recycle n-hexane for such cocurrent purge purposes. The amount of recycle n-hexane and the cost of equipment and the energy consumed in processing said recycle n-hexane is, however, appreciably reduced by the practice of the invention. It will be appreciated that, for purposes of the invention, the portion of the desorption effluent used for cocurrent purge purposes is that necessary to achieve the desired product purity, i.e. separation of normal paraffins from non-normal hydrocarbons. For this purposes several bed volumes of sorbable gas are commonly employed, e.g. from about 2.5 to about 5 bed volume voids, and it is surprising that the adsorbent bed size need not be increased to adsorb the additional normal paraffins introduced with the desorption effluent used as cocurrent purge. The additionally adsorbed normal paraffins from the desorption effluent serve to increase the concentration thereof available for subsequent desorption and recovery in continuous processing operations.

Those skilled in the art will appreciate, particularly from the Avery disclosure, that any desired temperature in the range of from about 500° F. to about 800° F. and pressure in the range of from about 20 to about 65 p.s.i.a. can be used in the subject isobaric adsorption-copurge-desorption process for normal paraffin recovery from kerosene feed streams. It will also be appreciated that temperatures up to 700° F. can be used in the processing of gas oil-containing feedstreams. Such temperature will determine the amount of dilution employed at the desired operating pressure for gas oil feedstreams. From such factors and the desired purity of the product, feedstream characteristics, adsorbent performance capability and the like, those skilled in the art can readily determine the required dilution of the gas oil feed by redistilled, recycle n-hexane, by the cocurrent purge effluent or by a portion of the desorption effluent as indicated above, to enable the gas oil feed to be processed at below 700° F. while avoiding capillary condensation effects.

The invention provides a valuable improvement in the constant pressure process for separating normal paraffins from hydrocarbon mixtures. The overall technical-economic feasibility of the separation process is thus enhanced by the invention in a manner entirely compatible with the known separation process and the requirements thereof, particularly in the treatment of gas oil-containing feedstocks.

What is claimed is:

1. In an isobaric process for separating normal paraffins from non-normal hydrocarbons in a feed stream containing between 10 and 40 mol percent normal paraffins having 10 to 25 carbon atoms and non-normal hydrocarbons by (1) the selective adsorption of normal paraffins by passage of said feed stream through a molecular sieve adsorbent bed, (2) cocurrent purge with n-hexane to sweep out void space vapor containing a high concentration of non-normal hydrocarbons from the effluent end of the bed, (3) countercurrent purge with n-hexane to desorb normal paraffin adsorbate from the bed, (4) recovery of n-hexane from said separated normal paraffins and non-normal hydrocarbons, and (5) recycling of said n-hexane for purging of said bed, the improvement comprising diverting a portion of the desorption effluent from said countercurrent purge step as a source of said n-hexane used for cocurrent purge, the quantity of said countercurrent purge effluent diverted as cocurrent purge being that necessary to achieve a desired degree of separation of said normal paraffins and non-normal hydrocarbons and comprising from about 2.5 to about 5 bed volume voids, whereby the equipment size and energy consumption for the processing of said recycle n-hexane is reduced, without need to increase the adsorbent bed size to adsorb the additional normal paraffins introduced to the bed with the desorption effluent used as cocurrent purge gas.

2. The process of claim 1 in which said feedstream comprises a gas oil-containing feedstream that is diluted with n-hexane so that adsorption is carried out at less than 700° F. without capillary condensation.

3. The process of claim 2 in which said isobaric pressure is in the range of from about 15 to about 65 p.s.i.a., said adsorption being carried out at a temperature of from about 500° to 700° F.

4. The process of claim 2 and including diluting said gas oil-containing feedstream with cocurrent purge effluent as a source of said n-hexane.

5. The process of claim 2 and including diluting said gas oil-containing feed stream with the portion of said countercurrent purge effluent from a bed completing its desorption step, said effluent having a normal paraffin content other than said n-hexane, of below about 6 weight percent.

6. The process of claim 1 in which said feedstream comprises a kerosene-containing feedstream.

7. The process of claim 6 in which said isobaric pressure is in the range of from about 20 to about 65 p.s.i.a., said adsorption being carried out at a temperature of from about 500° to 800° F.

8. In an isobaric process for separating normal paraffins from non-normal hydrocarbons in a gas oil-containing feed stream containing between 10 and 40 mol percent normal paraffins having 10 to 25 carbon atoms and non-normal hydrocarbons by (1) the selective adsorption of normal paraffins by passage of said feed stream through a molecular sieve adsorbent bed, (2) cocurrent purge with n-hexane to sweep out void space vapor containing a high concentration of non-normal hydrocarbons from the effluent end of the bed, (3) countercurrent purge with n-hexane to desorb normal paraffin adsorbate from the bed, (4) recovery of n-hexane from said separated normal paraffins and non-normal hydrocarbons, and (5) recycling of said n-hexane for purging of said bed, the improvement comprising:

(a) diverting a portion of the desorption effluent from said countercurrent purge step as a source of said n-hexane used for cocurrent purge; and
(b) diluting said gas oil-containing feed stream with cocurrent purge effluent as a source of n-hexane so that the selective adsorption step is carried out at less than 700° F. without capillary condensation, about the last 30% to 70% of the total cocurrent purge effluent being used for said feedstock dilution purposes, whereby the equipment size and energy consumption for the processing of said recycle n-hexane is reduced.

9. The process of claim 8 in which about the last 50% to 70% of the total cocurrent purge effluent is used for feedstock dilution.

10. The process of claim 8 in which the adsorption temperature is from about 600° F. to about 700° F.

* * * * *